(12) United States Patent
Walden et al.

(10) Patent No.: US 10,070,292 B2
(45) Date of Patent: Sep. 4, 2018

(54) PROVIDING MULTIPLE VIRTUAL BLUETOOTH LOW ENERGY DEVICES

(71) Applicant: Emmoco, Inc., Austin, TX (US)

(72) Inventors: Charles Walden, Austin, TX (US); Robert Frankel, Goleta, CA (US)

(73) Assignee: Emmoco, Inc., Austin, TX (US)

( * ) Notice: Subject to any disclaimer, the term of this patent is extended or adjusted under 35 U.S.C. 154(b) by 0 days.

(21) Appl. No.: 14/668,289

(22) Filed: Mar. 25, 2015

(65) Prior Publication Data
US 2015/0281877 A1    Oct. 1, 2015

Related U.S. Application Data

(60) Provisional application No. 61/969,856, filed on Mar. 25, 2014.

(51) Int. Cl.
| | |
|---|---|
| *H04B 7/00* | (2006.01) |
| *H04W 4/80* | (2018.01) |
| *H04W 4/00* | (2018.01) |
| *H04W 84/18* | (2009.01) |

(52) U.S. Cl.
CPC ............. *H04W 4/80* (2018.02); *H04W 4/008* (2013.01); *H04W 84/18* (2013.01)

(58) Field of Classification Search
CPC ... H04W 4/008; H04W 76/023; H04W 84/18; H04W 8/005
USPC ............................................. 455/41.1, 41.2
See application file for complete search history.

(56) References Cited

U.S. PATENT DOCUMENTS

| | | | |
|---|---|---|---|
| 2006/0080460 A1* | 4/2006 | Kobayashi ............ | H04L 45/586 709/238 |
| 2012/0142271 A1* | 6/2012 | Zhodzishsky ......... | H04L 67/303 455/41.2 |
| 2012/0171958 A1* | 7/2012 | Cornett .................. | H04W 4/80 455/41.2 |
| 2014/0206346 A1* | 7/2014 | Kiukkonen ....... | H04W 52/0229 455/426.1 |

* cited by examiner

*Primary Examiner* — Raj Chakraborty
(74) *Attorney, Agent, or Firm* — Jeffrey T. Placker; Holland & Knight LLP

(57) ABSTRACT

Multiple virtual Bluetooth low energy peripheral devices may be provided via a single Bluetooth low energy radio set. In an embodiment, a method for providing multiple virtual Bluetooth low energy peripheral devices may include defining a first Bluetooth low energy packet having a first device attribute. The method may also include defining a second Bluetooth low energy packet having a second device attribute. The method may also include transmitting the first Bluetooth low energy packet as a first virtual Bluetooth low energy peripheral device via a Bluetooth low energy radio set. The method may further include transmitting the second Bluetooth low energy packet as a second virtual Bluetooth low energy peripheral device via the Bluetooth low energy radio set.

18 Claims, 4 Drawing Sheets

PROVIDING MULTIPLE VIRTUAL BLUETOOTH LOW ENERGY DEVICES

CROSS-REFERENCE TO RELATED APPLICATIONS

This application claims the benefit of U.S. provisional patent application Ser. No. 61/969,856, filed on Mar. 25, 2014, the entire contents of which are incorporated herein by reference.

TECHNICAL FIELD

The present disclosure generally related to Bluetooth low energy devices, and more particularly related to providing multiple virtual Bluetooth low energy devices using a single radio set.

BACKGROUND

Bluetooth low energy (BLE) is a specification that enables radio frequency communication between various types of devices. One particular portion of the BLE standard is the advertiser/scanner model that allows a device designated as an advertiser device to broadcast information that can be received by one or more scanner devices. An advertiser is also known as a BLE peripheral device, and a scanner device is also known as a central device. In certain cases, a single device can act in an advertiser and scanner role. Typically, BLE devices may be utilized in relatively low power applications, often within a relatively short range (e.g., on the order of 50 meters or less). In keeping with the intent of providing relatively low power usage, the data communicated using BLE technologies may often be fairly constrained, particularly in the case of BLE advertiser devices. However, the lower power applications and constrained data capabilities may make it possible to achieve low cost devices.

SUMMARY

In an implementation, a computer-implemented method may include defining, by a processor, a first Bluetooth low energy packet having a first device attribute. The method may also include defining, by the processor, a second Bluetooth low energy packet having a second device attribute. The method may also include transmitting, by the processor, the first Bluetooth low energy packet as a first virtual Bluetooth low energy peripheral device via a Bluetooth low energy radio set. The method may further include transmitting, by the processor, the second Bluetooth low energy packet as a second virtual Bluetooth low energy peripheral device via the Bluetooth low energy radio set.

One or more of the following features may be included. The first device attribute may include a first universal unique identifier, and the second device attribute may include a second universal unique identifier. The first device attribute may include a first MAC address, and the second device attribute may include a second MAC address. The first device attribute may include a first Bluetooth low energy peripheral profile, and the second device attribute may include a second Bluetooth low energy peripheral profile. The first Bluetooth low energy packet and the second Bluetooth low energy packet may be configured to be correlated to the Bluetooth low energy radio set as a common hardware device.

Transmitting the first Bluetooth low energy packet may include transmitting the first Bluetooth low energy packet at a first time interval. Transmitting the second Bluetooth low energy packet may include transmitting the second Bluetooth low energy packet at a second time interval. Transmitting the first Bluetooth low energy packet and transmitting the second Bluetooth low energy packet may include time-wise multiplexing the first Bluetooth low energy packet and the second Bluetooth low energy packet.

According to another implementation, a computer-program product may include a non-transitory computer readable medium having a plurality of instructions stored on it. When executed by a processor, the instructions may cause the processor to perform operations including defining a first Bluetooth low energy packet having a first device attribute. Instructions may also be included for defining a second Bluetooth low energy packet having a second device attribute. Instructions may also be included for transmitting the first Bluetooth low energy packet as a first virtual Bluetooth low energy peripheral device via a Bluetooth low energy radio set. Instructions may further be included for transmitting the second Bluetooth low energy packet as a second virtual Bluetooth low energy peripheral device via the Bluetooth low energy radio set.

One or more of the following features may be included. The first device attribute may include a first universal unique identifier, and the second device attribute may include a second universal unique identifier. The first device attribute may include a first MAC address, and the second device attribute may include a second MAC address. The first device attribute may include a first Bluetooth low energy peripheral profile, and the second device attribute may include a second Bluetooth low energy peripheral profile. The first Bluetooth low energy packet and the second Bluetooth low energy packet may be configured to be correlated to the Bluetooth low energy radio set as a common hardware device.

Transmitting the first Bluetooth low energy packet may include transmitting the first Bluetooth low energy packet at a first time interval. Transmitting the second Bluetooth low energy packet may include transmitting the second Bluetooth low energy packet at a second time interval. Transmitting the first Bluetooth low energy packet and transmitting the second Bluetooth low energy packet may include time-wise multiplexing the first Bluetooth low energy packet and the second Bluetooth low energy packet.

According to yet another implementation, a computing system may include a processor device coupled with a memory device. The processor device may be configured for defining a first Bluetooth low energy packet having a first device attribute. The processor device may also be configured for defining a second Bluetooth low energy packet having a second device attribute. The computing system may further include a Bluetooth low energy radio set. The Bluetooth low energy radio set may be configured for transmitting the first Bluetooth low energy packet as a first virtual Bluetooth low energy peripheral device. The Bluetooth low energy radio set may further be configured for transmitting the second Bluetooth low energy packet as a second virtual Bluetooth low energy peripheral device via the Bluetooth low energy radio set.

One or more of the following features may be included. The first device attribute may include a first universal unique identifier, and the second device attribute may include a second universal unique identifier. The first device attribute may include a first MAC address, and the second device attribute may include a second MAC address. The first device attribute may include a first Bluetooth low energy peripheral profile, and the second device attribute may include a second Bluetooth low energy peripheral profile. The first Bluetooth low energy packet and the second Bluetooth low energy packet may be configured to be correlated to the Bluetooth low energy radio set as a common hardware device.

Transmitting the first Bluetooth low energy packet may include transmitting the first Bluetooth low energy packet at a first time interval. Transmitting the second Bluetooth low energy packet may include transmitting the second Bluetooth low energy packet at a second time interval. Transmitting the first Bluetooth low energy packet and transmitting the second Bluetooth low energy packet may include time-wise multiplexing the first Bluetooth low energy packet and the second Bluetooth low energy packet.

The details of one or more implementations are set forth in the accompanying drawings and the description below. Other features and advantages will become apparent from the description, the drawings, and the claims.

DETAILED DESCRIPTION OF EXAMPLE EMBODIMENTS

Figure 1:
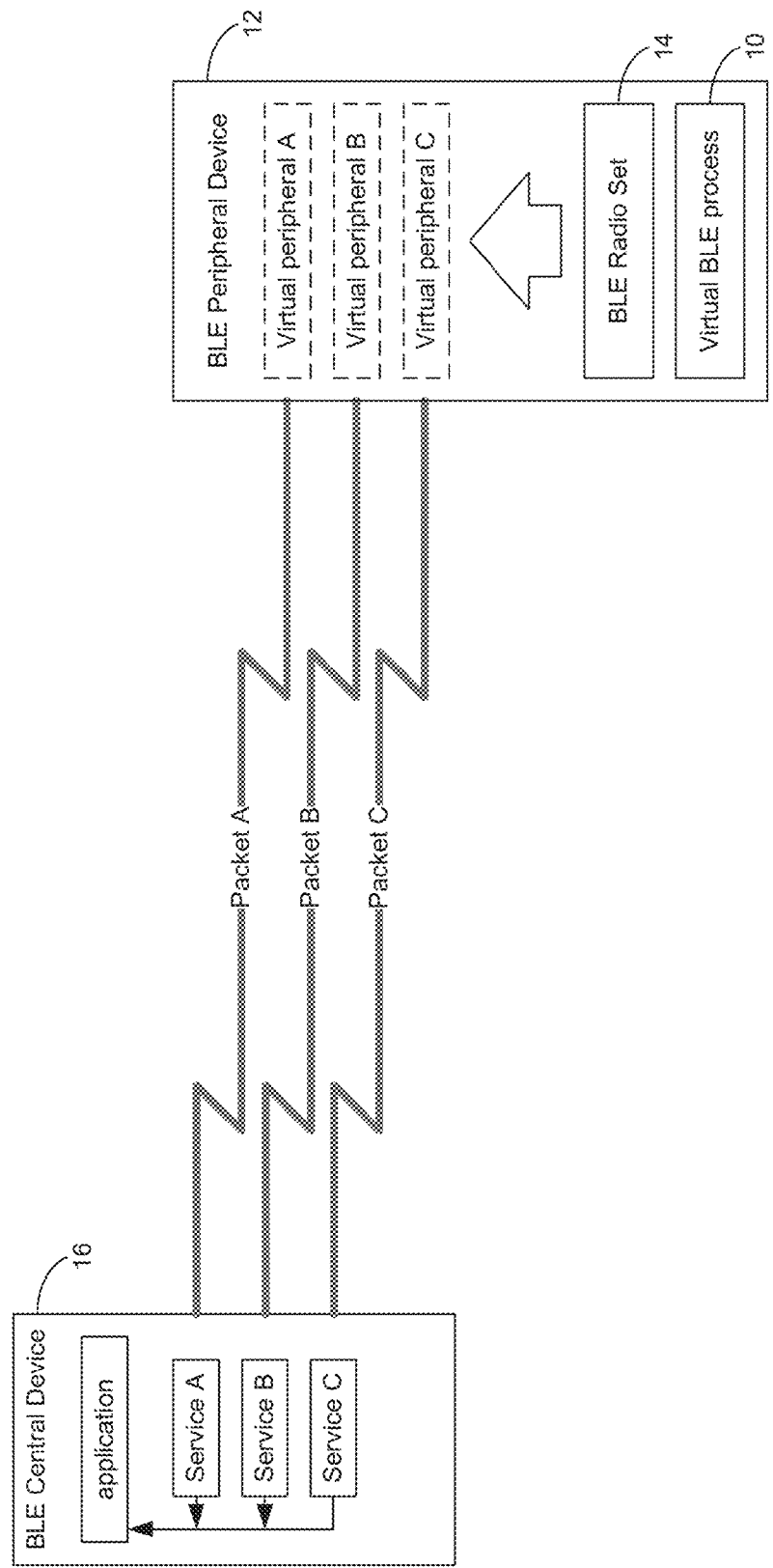
FIG. 1 diagrammatically depicts a Bluetooth low energy (BLE) communication environment including a BLE peripheral device and a BLE central device, according to an example embodiment.

Bluetooth low energy (BLE) communications may generally allow for relatively low power consumption radio frequency communications between various devices. Bluetooth low energy may also be known as Bluetooth Smart, and may be generally described in the Bluetooth Core v. 4.0 Specification for the Bluetooth System from the Bluetooth Special Interest Group of Kirkland, Wash., which was published on 30 Jun. 2010, and which is incorporated herein by reference. As part of the BLE specification, advertising capabilities by BLE peripherals may be supported in which the BLE peripheral device may broadcast advertising packets (also referred to herein as BLE advertising packets) that may be received and utilized by BLE receiving devices. As generally used herein, a BLE peripheral device may include any BLE device that is capable of transmitting BLE advertising packets. Examples of BLE peripheral devices may include beacons (e.g., which may broadcast static information, although the broadcast information may be changed over time), access control devices (such as key fobs that may broadcast access control codes, e.g., for opening electronic locks or permitting access to computing devices), sensor devices (e.g., thermometers, healthcare sensors such as heartrate monitors or blood pressure monitors), as well as various other devices that may be configured to broadcast BLE advertising packets.

The BLE central device may generally be any device that is capable of receiving and/or utilizing the BLE advertising packets broadcast by the BLE peripheral device. Examples of BLE central device may include, for example, BLE enabled smartphones, BLE enabled watches, BLE enabled computing devices (such as desktop computers, laptop computers, tablet computing devices, etc.), special purpose devices, as well as various other devices. The BLE central device may utilize the data included within the advertising packet in a variety of different ways, e.g., based upon, at least in part, the nature of the underlying BLE peripheral device and the data included within the BLE advertising packet. For example, in some instances the BLE central device may be able to directly utilize data included within the BLE advertising packet. For example, the BLE advertising packet may include a value captured and broadcast by a sensor, such as a thermometer. In other situations, the BLE advertising packet may only include a reference (such as a BLE peripheral identification, or other reference) which may allow the BLE central to obtain information from a datastore. For example, a BLE peripheral identification may be used to identify information within a database, such as location information, promotional information, or the like. In one particular illustrative example, upon a user entering a retail establishment a BLE central device, such as a smartphone, may receive a BLE advertising packet from a BLE peripheral device. The BLE advertising packet may include, for example, an identification number associated with the BLE peripheral device. The BLE central device may execute an application associated with the retail establishment to access promotional information associated with the particular BLE peripheral device based upon, at least in part, the identification number associated with the BLE peripheral device. For example, the identification number associated with the BLE peripheral device may be associated with a location of the BLE peripheral device within the retail establishment. A retail product may be identified as being displayed within proximity of the location of the BLE peripheral device within the retail establishment. Further a promotional special may be associated with the retail product. In response to receiving the BLE advertising packet and accessing the information associated with the BLE peripheral identification number, information regarding the promotional special may be made available to a user via the BLE central device. Various additional and/or alternative implementations may similarly be utilized.

In addition to solely broadcasting advertising packets, some BLE peripheral devices may be capable of bidirectional communication with a BLE central device. For example, the BLE peripheral device may broadcast an advertising packet, thereby allowing the BLE peripheral to be discovered by a BLE central. Once the BLE central has discovered the BLE peripheral device, the BLE central device may connect with the BLE peripheral device to enable bidirectional communication between the BLE peripheral device and the BLE central device. The connection between the BLE peripheral device and the BLE central device may, for example, allow the BLE central device to receive additional, and/or specific types, of information from the BLE peripheral device. Additionally/alternatively, the connection between the BLE peripheral device and the BLE central device may allow, for example, configuration information to be provided to the BLE peripheral device from the BLE central device, e.g., to change or set one or more operational parameters associated with the BLE peripheral device. The connection between the BLE peripheral device and the BLE central device may allow for various other communication types and/or objectives, and the present disclosure should not be limited by the foregoing examples.

Typically the information available via a BLE advertising packet may be relatively limited. For example, the BLE specification may provide for a BLE advertising packet payload of 31 bytes. In addition to any limitations associated with the size of the advertising packet payload, BLE central device compatibility may vary among different BLE advertising packet formats (e.g., based upon, at least in part, operating system level compatibility, applications required for consuming the packet data, etc.). Consistent with the present disclosure, a single BLE peripheral device (e.g., a single BLE peripheral device radio set) may be capable of broadcasting packets having different device attributes. As such, it may be possible for the single BLE peripheral device to emulate more than one BLE devices, as virtual BLE peripheral devices. That is, the single physical BLE peripheral device (e.g., the hardware device via a single BLE radio set) may functionally operate as multiple different BLE peripheral devices (i.e., the multiple virtual BLE peripheral devices). A BLE central device may receive BLE packets from each of the virtual BLE peripheral devices, and may respond to/identify the BLE packets from the different virtual BLE peripheral devices as originating from distinct or separate BLE peripheral devices.

In some embodiments, a BLE central may receive BLE packets from a plurality of virtual BLE peripheral devices, which may appear to the BLE central device as being separate or distinct BLE peripheral devices. In some situations, the multiple virtual BLE peripheral devices may be leveraged to increase the effective advertising payload. For example, each virtual BLE peripheral may provide an advertising packet payload of 31 bytes. Therefore, the aggregate advertising packet payload of the plurality of virtual BLE peripheral devices may be greater than the maximum permitted by a single BLE peripheral device. Further, profiles associated with some BLE peripheral device types may limit the available behaviors of the BLE peripheral device. For example, some beacon BLE peripheral devices may only be capable of advertising, and may not be capable of connecting to a BLE central device. In such an embodiment, a single physical BLE peripheral device may provide a first virtual BLE peripheral device may be an advertising-only beacon BLE peripheral device, and may also provide a second virtual BLE peripheral device, which may be connectable virtual BLE peripheral device. In such an embodiment, the first, advertising-only beacon BLE peripheral device may broadcast advertising packets. The second, connectable virtual BLE peripheral device may, for example, allow a connection with the BLE central device, e.g., to allow configuration of the first virtual BLE peripheral device, and/or other interaction with the physical BLE peripheral device. In still further embodiments, the multiple virtual BLE peripheral devices may be configured to broadcast packets that may be configured to be consumed by different underlying applications, interact with different operating system environments (e.g., thereby making different ones of the virtual BLE peripheral devices compatible with different BLE central devices that execute different operating systems), and/or otherwise provide different services.

As generally discussed above, a physical BLE peripheral device may provide a plurality of virtual BLE peripheral devices. Packets associated with the different virtual BLE peripheral devices may include information that may cause the packets to be identified and/or interacted with by a BLE central device (or several BLE central devices collectively) as originating from different BLE peripheral devices. For example and referring to FIG. 1, virtual BLE process 10 may reside on an be executed by physical BLE peripheral device 12. Physical BLE peripheral device 12 may include any form of BLE peripheral device, such as a beacon, a BLE enable sensor, a computing device integrating BLE peripheral functionality, or the like. The instruction sets and subroutines of virtual BLE process 10 may be stored on a storage device (e.g., ROM, RAM, flash memory, hard drive, solid state drive, etc., not shown) associated with physical BLE peripheral device 12, and may executed by one or more processors (not shown) and memory architectures (not shown) included within physical BLE peripheral device 12.

Physical BLE peripheral device 12 may implement virtual BLE process 10 to provide two or more virtual BLE peripheral devices (e.g., virtual peripheral device A, virtual peripheral device B, and virtual peripheral device C, shown in FIG. 1). While virtual BLE process 10 is shown implementing three virtual BLE peripheral devices (i.e., virtual peripheral device A, virtual peripheral device B, and virtual peripheral device C) in FIG. 1, this is intended for the purpose of illustration, as virtual BLE process 10 may implement two or more virtual BLE peripheral devices.

Figure 2:
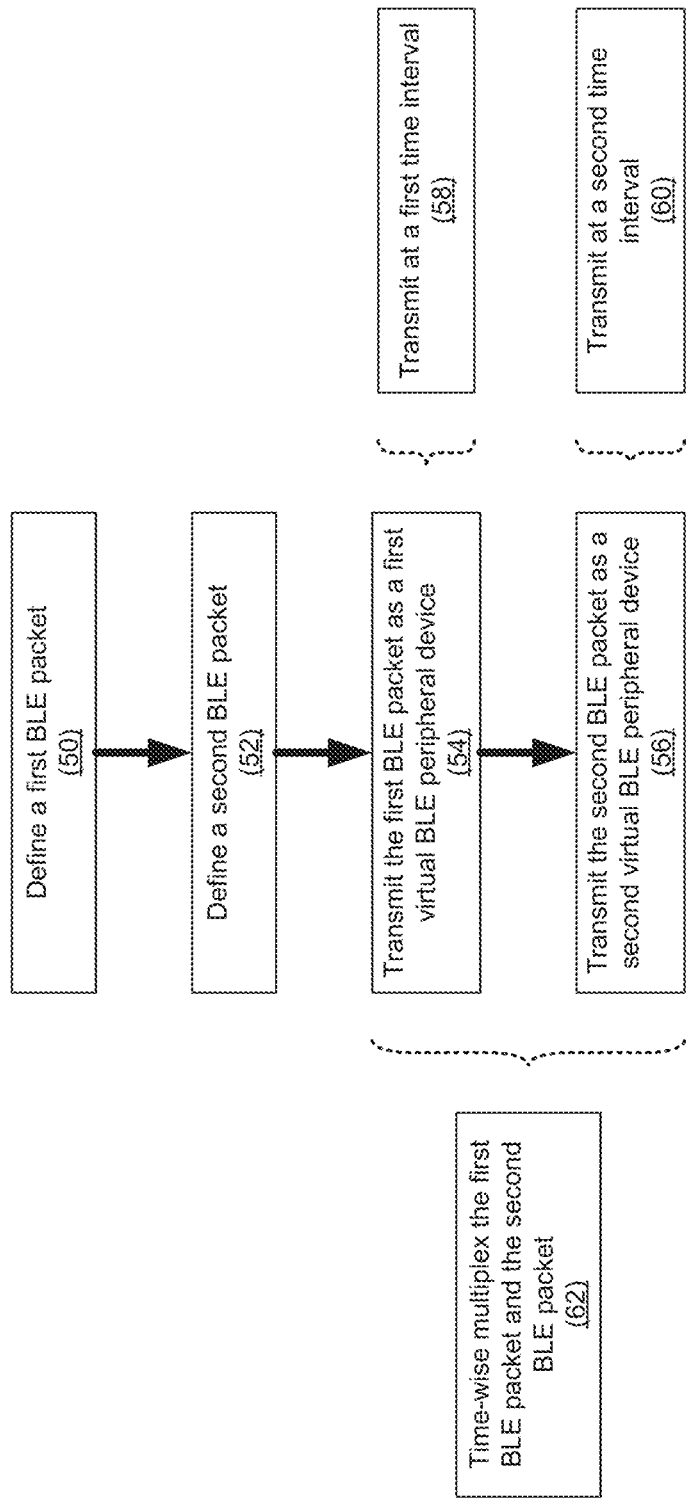
FIG. 2 is a flowchart of a virtual BLE peripheral process that may be implemented by the BLE peripheral device of FIG. 1, according to an example embodiment.

Referring also to FIG. 2, and as will be discussed in greater detail below, virtual BLE process 10 may define 50 a first Bluetooth low energy packet having a first device attribute. Virtual BLE process 10 may also define 52 a second Bluetooth low energy packet having a second device attribute. Virtual BLE process 10 may also transmit 54 the first Bluetooth low energy packet as a first virtual Bluetooth low energy peripheral device via a Bluetooth low energy radio set (e.g., BLE radio set 14). Further, virtual BLE process 10 may transmit 56 the second Bluetooth low energy packet as a second virtual Bluetooth low energy peripheral device via the Bluetooth low energy radio set (i.e., BLE radio set 14). Virtual BLE process 10 may define one or more additional BLE packets having corresponding additional device attributes. Virtual BLE process may similarly transmit any additional BLE packets as one or more additional virtual BLE peripheral devices via the BLE radio set.

Continuing with the illustrative example of FIG. 1, BLE central device 14 may receive one or more of packet A, packet B, and packet C. BLE central device 14 may identify each of packet A, packet B, and packet C as having been broadcast by a different BLE peripheral device. For example, BLE central device 14 may identify packet A as having been broadcast by a first BLE peripheral device (e.g., a BLE peripheral device identified as virtual peripheral A), may identify packet B as having been broadcast by a second BLE peripheral device (e.g., a BLE peripheral device identified as virtual peripheral B), and may identify packet C as having been broadcast by a third BLE peripheral device (e.g., a BLE peripheral device identified as virtual peripheral C). In the illustrated example embodiment, packet A, packet B, and packet C may be associated with a different BLE peripheral type and may leverage a different service available via BLE central device 14 (e.g., service A, service B, and service C, respectively). It will be appreciated that the illustrated embodiment is intended for the purpose of illustration, and not limitation. For example, and as generally described above, the different packets, identified as being broadcast by different BLE peripheral devices need not be associated with different BLE peripheral types, but rather may be utilized, e.g., for increasing the effective broadcast content size (e.g., via aggregate payloads of the different packets), as well as other purposes. While only a single BLE central device (e.g., BLE central device 16) is shown, it will be appreciated that the packets broadcast by BLE peripheral device 12 (e.g., packet A, packet B, and packet C associated with virtual peripheral A, virtual peripheral B, and virtual peripheral C, respectively) may be received by more than one BLE central device.

As generally discussed above with reference to FIG. 2, virtual BLE process 10 may define 50 a first Bluetooth low energy packet having a first device attribute. Virtual BLE process 10 may also define 52 a second Bluetooth low energy packet having a second device attribute. Virtual BLE process 10 may also transmit 54 the first Bluetooth low energy packet as a first virtual Bluetooth low energy peripheral device via a Bluetooth low energy radio set (e.g., BLE radio set 14). Further, virtual BLE process 10 may transmit 56 the second Bluetooth low energy packet as a second virtual Bluetooth low energy peripheral device via the Bluetooth low energy radio set (i.e., BLE radio set 14).

As discussed, virtual BLE process may define 50 a first Bluetooth low energy packet having a first device attribute, and may also define 52 a second Bluetooth low energy packet having a second device attribute. The first packet and the second packet may include, for example, a BLE advertising packet that may be broadcast on a periodic basis, and may be received by one or more BLE central devices that may be within range of the broadcast during one or more of the periodic broadcasts. In some embodiments, the first and second packets may be broadcast on the periodic basis without a change in the content of the packet (i.e., the packet payload). In other embodiments, the payload of one or both of the first and second packet may change over time. For example, if the first packet includes sensor data (such as temperature measured by a BLE enabled thermometer). In such an embodiment, virtual BLE process 10 may update at least a portion of the packet content (e.g., at least a portion of the packet payload), but may include the first device attribute as part of the updated packet. In other embodiments, when at least a portion of the content of a packet is updated, virtual BLE process may define a new packet. The new packet may include the first device attribute and/or the new packet may include a new device attribute (e.g., which may be different from the first device attribute and from the second device attribute). As generally discussed above, virtual BLE process 10 may define additional packets, e.g., that may have additional device attributes.

The first and second device attributes included within the respective first and second packets may include information within the packet that may cause a BLE central to associate each packet with a distinct BLE peripheral device. In an embodiment, the first device attribute may include a first universal unique identifier, and the second device attribute may include a second universal unique identifier. For example, in some embodiments, a universal unique identifier may be utilized to distinguish one BLE peripheral device from another BLE peripheral device. The universal unique identifier may include a numerical value that may be included within the packet. Consistent with such an embodiment, virtual BLE process 10 may define 50 the first packet having a first universal unique identifier as a first device attribute and may define 52 the second packet having a second (i.e., different) universal unique identifier as a second device attribute. Consistent with such an embodiment, a BLE central (and/or an application executed by the BLE central) may identify the first packet as originating from a different BLE peripheral device that the second packet (e.g., the BLE central may identify the first packet as originating from a first BLE peripheral device and the second packet as originating from a second BLE peripheral device), based upon, at least in part, the first and second universal unique identifiers being different. Because the first and second packets may actually originate from the same BLE peripheral device, the first and second peripheral devices identified as the respective origin of the first and second packets may include a first and second virtual BLE peripheral device.

In another embodiment, the first device attribute may include a first MAC address (i.e., media access control address), and the second device attribute may include a second MAC address. For example, BLE devices (including BLE peripheral devices and BLE central devices) may have assigned MAC addressed that may identify the device from which transmitted content originates. The MAC address of the device transmitting the data may be included as part of the packet information (e.g., as part of the payload of the packet). Accordingly, the MAC address of the device transmitting the packet may be utilized to distinguish between BLE devices. In an implementation the first device attribute may include a first MAC address (e.g., which may be associated with a first BLE peripheral device), and the second device attribute may include a second MAC address (e.g., which may be associated with a second BLE peripheral device). Accordingly, virtual BLE process 10 may define 50 the first packet having the first MAC address, and virtual BLE process 10 may define 52 the second packet having the second MAC address.

In some embodiments, the first device attribute may include a first Bluetooth low energy peripheral profile, and the second device attribute may include a second Bluetooth low energy peripheral profile. For example, a BLE peripheral profile may generally specify the services available in connection with a BLE peripheral device. For example, a BLE device having a heart rate profile may enable a collector device to connect and interact with a heart rate sensor, while a BLE device having a proximity profile may enable proximity monitoring between two devices. Accordingly, a BLE advertising packet consistent with a first profile and a BLE advertising packet consistent with a second profile may be transmitted by different BLE peripheral devices. Accordingly, virtual BLE process 10 may define 50 a first packet having a first profile and may define 52 a second packet having a second profile. A BLE central receiving the first packet having the first profile and the second packet having the second profile may identify the first and second packets as originating from different BLE peripheral devices. Accordingly, the defining 50, 52, the first and second packets having respective first and second profiles, virtual BLE process may emulate a first and second virtual BLE peripheral device (the packets of which may actually be transmitted by a single BLE radio set).

It will be appreciated that virtual BLE process 10 may define 50, 52 the first and second packets each having device attributes that may associate the first and second packets with different BLE peripheral attributes (e.g., which may allow a BLE central device to identify the first packet as originating from a first BLE peripheral device and to identify the second packet as originating from a second BLE peripheral device). For example, in the specific use case of an iBeacon BLE peripheral device (iBeacon is a trademark of Apple Incl. in the United States, other countries, or both), individual BLE peripheral devices may be distinguished, at least in part, based upon two number sets included within the packet payload (i.e., the major number and the minor number). Accordingly, first and second packets may be defined 50, 52 having different major numbers and/or different minor numbers, thereby identifying different BLE peripheral devices. Various other implementations may include different device attributes that may be utilized for distinguishing between different BLE peripheral devices. Virtual BLE process 10 may implement any such device attributes to allow BLE peripheral device 12 to emulate multiple BLE peripheral devices, thereby providing multiple virtual BLE peripheral devices.

In some embodiments, at least one of the virtual BLE peripheral devices may include a connectable device, e.g., which may allow bidirectional communication between the virtual BLE peripheral device and the BLE central device. In some such embodiments, the bidirectional communication between the virtual BLE peripheral device and the BLE central device may allow, for example, configuration settings with regard to one or more of the virtual BLE peripheral devices and/or with regard to physical BLE peripheral device 12 to be established and/or to be changed. Examples of configuration setting may include, but are not limited to transmission intervals associated with one or more of the virtual BLE peripheral devices, advertising content associated with one or more of the virtual BLE peripheral devices, the establishment (or removal) of one or more virtual BLE peripheral devices, as well as various other, or alternative, attributes.

In addition to establishing and/or changing configuration settings, connection between at least one virtual BLE peripheral device and BLE central device 16 may be utilized for various purposes. For example, connection between at least one virtual BLE peripheral device and BLE central device 16 may allow information collected by one or more of the virtual BLE peripheral devices to the accessed by BLE central device 16. It will be appreciated that a connection between at least one of the virtual BLE peripheral devices and BLE central device 16 may be utilized for a wide variety of additional/alternative purposes.

In an embodiment, the first Bluetooth low energy packet and the second Bluetooth low energy packet may be configured to be correlated to the Bluetooth low energy radio set as a common hardware device. For example, while it may be useful for each of the first packet and the second packet to behave (at least in part) as though they originated from different BLE peripheral devices, in some situations it may be desirable to also be able to correlate the first and second packets to a common hardware device. For example, in one implementation a plurality of virtual BLE peripheral devices may be implemented to provide an aggregate payload that is greater than the 31 byte payload achievable by a single BLE peripheral device. In such a situation, in order to allow the information from the individual packets of the various virtual BLE peripheral devices to be aggregated, it may be desirable for BLE central device 16 to correlate the packets of the various virtual BLE peripheral devices to a single common hardware device. It may similarly be desirable to correlate the first and second packets (e.g., and therein the first and second virtual BLE peripheral devices) with a common physical hardware device in a variety of other situations. It should be continued to be understood that while a first and second packet (and also a first and second virtual BLE peripheral device) may be referenced, additional packets (and virtual BLE peripheral devices) may be implemented.

Virtual BLE process 10 may employ a variety of techniques to correlate the first packet and the second packet to a common hardware device. For example, in an embodiment the first device attribute and the second device attribute may be correlated via a database and/or lookup table that may be accessed, or referenced, by BLE central device 16 (e.g., by an application executed by BLE central device 16 and/or that may otherwise interact with BLE central device 16). According to such an embodiment, the first device attribute and the second device attribute may be associated with one another via the database or lookup table (or other electronic record or file). In another implementation, the first and the second packet may each include information (e.g., as part of the payload and/or as part of a header, etc.) that may correlate the first and the second packet with a common hardware device. For example, the packet may include a physical hardware identifier, e.g., which may identify physical BLE peripheral device 12. Accordingly, which each of the first and the second packet may include respective first and second device attribute information, each of the first and second packet may also include common physical device information that may allow BLE central device 16 to correlate the first packet and the second packet with BLE peripheral device 12. In yet a further embodiment, both the first and the second packet may include information that may cryptographically and/or algorithmically utilized to correlate the first packet and the second packet with BLE peripheral device 12. In such an implementation, the information included in each of the first packet and the second packet may be different, but may still be correlated to BLE peripheral device 12.

Virtual BLE process 10 may transmit 54 the first Bluetooth low energy packet as a first virtual Bluetooth low energy peripheral device via a Bluetooth low energy radio set (e.g., BLE radio set 14). Further, virtual BLE process 10 may transmit 56 the second Bluetooth low energy packet as a second virtual Bluetooth low energy peripheral device via the Bluetooth low energy radio set (i.e., BLE radio set 14). As described above, the first packet and the second packet may respectively include a first device attribute and a second device attribute, which may allow BLE central device 16 to respectively identify the first packet as originating from a first BLE peripheral device (i.e., a first virtual BLE peripheral device) and originating form a second BLE peripheral device (i.e., a second virtual BLE device). For example, as shown in the illustrative example of FIG. 1, BLE peripheral device 12 may transmit 54 packet A (which may include a first device attribute associated with virtual peripheral A), transmit 56 packet B (which may include a second device attribute associated with virtual peripheral B), and to transmit packet C (which may include a third device attribute associated with virtual peripheral C). Accordingly, BLE central device 16 may identify each of packet A, packet B, and packet C as originating from a different BLE peripheral device (e.g., virtual peripheral A, virtual peripheral B, and virtual peripheral C, respectively).

In an embodiment, transmitting 54 the first Bluetooth low energy packet may include transmitting 58 the first Bluetooth low energy packet at a first time interval. Similarly, transmitting 56 the second Bluetooth low energy packet may include transmitting 60 the second Bluetooth low energy packet at a second time interval. For example, each of the first packet and the second packet may be transmitted 54, 56, at various intervals ranging from on the order of several milliseconds to several minutes (or greater). In some embodiments, the time intervals for transmitting the first packet and for transmitting the second packet may be the same. For example, each of the first packet and the second packet may be broadcast at 200 ms intervals, 100 ms apart. Accordingly, the first packet may be transmitted 54 at 0 ms, 200 ms, 400 ms, etc. Similarly, the second packet may be transmitted at 100 ms, 300 ms, 500 ms, etc. According to such a transmission scheme, the first packet and the second packet may be transmitted in an 1:1 ratio. According to other embodiments, the first packet an the second packet may be transmitted in different ratios. For example, a greater transmission frequency may provide more frequent opportunities for discovery by BLE central device 16, but may be more power intensive. Conversely, a longer time interval between transmission may present fewer opportunities for discovery, but may be less power intensive (e.g., thereby providing a longer battery life for BLE peripheral device 12). In some embodiments, the time intervals may be configurable. For example, in a particular implementation, as discussed above, one or more of the virtual BLE peripheral devices may include a connectable BLE peripheral device, e.g., which may permit a connection to be established for the purpose of configuring various attributes of one or more of the virtual BLE peripheral devices and/or of BLE peripheral device 12.

Consistent with the foregoing example in with the first packet and the second packet may be transmitted 58, 60 at different time intervals, transmitting 54 the first Bluetooth low energy packet and transmitting 56 the second Bluetooth low energy packet may include time-wise multiplexing 62 the first Bluetooth low energy packet and the second Bluetooth low energy packet. That is, the first packet and the second packet (as well as any other packets associated with respective virtual BLE peripheral devices) may be transmitted in an interleaved and/or alternating manner. Further, as discussed above, the packets associated with the various virtual BLE peripheral devices may be transmitted in any desired ratio. For example, the first packet and the second packet may be transmitted 54, 56 in a 3:1 ratio, with first packet being transmitted 54 three times for every one time that the second packet is transmitted 56. It will be appreciated that any desired transmission ration may be utilized. Further, consistent with the aspect of time-wise multiplexing 62 transmission of the first packet and the second packet (as well as any additional packets associated with respective virtual BLE peripheral devices), the first packet and the second packet may be transmitted by BLE radio set 14 over the same channels and/or over different channels.

Figure 3:
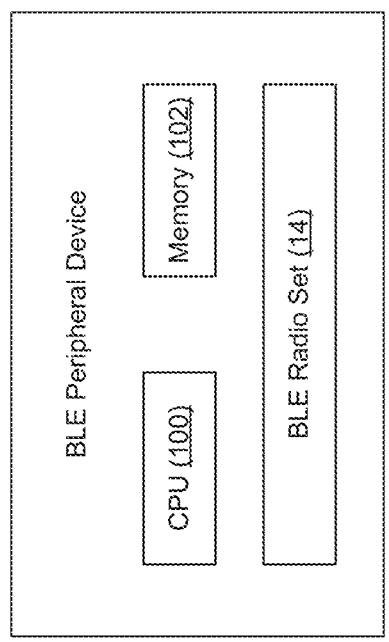
FIG. 3 diagrammatically depicts the BLE peripheral device of FIG. 1, according to an example embodiment.

Referring to FIG. 3, there is shown a diagrammatic view of BLE peripheral device 12. BLE peripheral device 12 may include CPU 100, which may execute virtual BLE process 10. Additionally, CPU 100 may execute any firmware and/or software associated with the operation of BLE peripheral device 12, including, but not limited to, firmware associated with controlling BLE radio set 14. Accordingly, in part, CPU 100 may process and forward data to BLE radio set 14 for broadcasting BLE data. As generally described, BLE radio set may transmit wireless signals to other BLE devices (such as BLE central device 16). In some embodiments, BLE radio set 14 may include a transceiver, e.g., which may be capable of bidirectional wireless communications with other BLE devices. In such an embodiment, BLE radio set 14 may similarly receive wireless signals from other BLE devices, and forward the data of the received wireless signals to CPU 100. Memory 102 may store the instruction sets and subroutines of virtual BLE process 10, as well as any software and/or firmware necessary for the operation of BLE peripheral device 12. Memory 102 may include, but is not limited to, RAM, ROM, flash memory, a hard drive, a solid state drive, or other volatile and/or non-volatile memory devices. While not shown, BLE peripheral device 12 may include additional modules and/or provide additional functionality, such as sensors, communication module for interacting with other devices, IO controllers, and the like.

Figure 4:
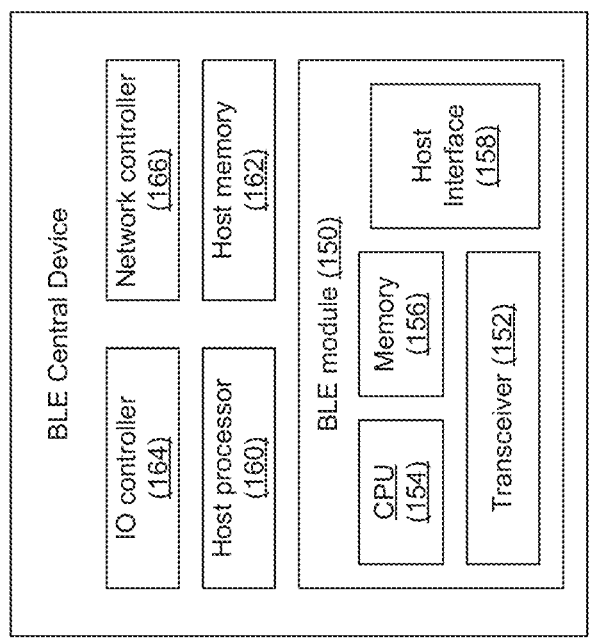
FIG. 4 diagrammatically depicts the BLE central device of FIG. 1, according to an example embodiment.

Referring also to FIG. 4, there is shown a diagrammatic view of BLE central device 16, according to an example embodiment. As generally discussed above, BLE central device 16 may include, but is not limited to, a smart phone, a mobile computing device (e.g., a laptop computer, a tablet computing device, a netbook computing device, or the like), a personal computer, a gaming system, a smart TV, a set top box, a custom device, or the like.

As shown, BLE central device 16 may include BLE module 150, which may generally allow communications between BLE central device 16 and another BLE device, such as BLE peripheral device 12. As shown, BLE module 150 may include transceiver 152, which may receive data (e.g., broadcast packets) broadcast from a BLE peripheral device. Transceiver 152 may forward the received data to CPU 154. Transceiver 152 may include suitable logic and/or circuitry to facilitate receiving and/or transmitting wireless signals with other BLE devices (e.g., BLE peripheral device 12). CPU 154 may execute software (including firmware) associated with the operation of BLE module 150 for managing the operation of transceiver 152, and/or the processing and forwarding of received data from transceiver 152 and/or the processing and forwarding of data to be transmitted by transceiver 152. BLE module 150 may also include memory 156, which may store one or more instruction sets executed by CPU 154, may store dated received from transceiver 152 and/or may store data to be transmitted by transceiver 152. Various additional and/or alternative data may be stored. Memory 156 may include, but is not limited to, RAM, ROM, flash memory, a hard drive, a solid state drive, or other volatile and/or non-volatile memory devices. BLE module 150 may interact with host processor 160 of BLE central device 16 via host interface 158.

BLE central device 16 may include host processor 160, which may be configured to e.g., process data and execute instructions/code associated with the operation of BLE module 150. Additionally/alternatively, host processor 160 may execute instructions associated with other functionality of BLE central device 16. Further, host processor 160 may be coupled to host memory 162. Host memory 162 may include but is not limited to: a hard disk drive; a tape drive; an optical drive; a RAID device; an NAS device, a Storage Area Network, a random access memory (RAM); a read-only memory (ROM); and all forms of flash memory storage devices. IO controller 164 may be configured to couple host processor 160 with various devices, such as keyboard (e.g., including a virtual keyboard and/or a touch-screen user interface), one or more display devices, and/or various other input and output devices. Host process 160 may also be coupled with network controller 166, which may be configured to couple host processor 160 with a network (e.g., including a wired network and/or a wireless network).

It will be appreciated that in some embodiments the functionality of one or more of transceiver 152, CPU 154 and memory 156 may be provided by one or more features of BLE central device 16, such as host processor 160, host memory 162, network controller 166, and the like. As such, the functionality of BLE module 150 may be provided by BLE central device without necessitating a discrete BLE module.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   defining, by a processor, a first Bluetooth low energy advertising packet having a first device attribute;
   defining, by the processor, a second Bluetooth low energy advertising packet having a second device attribute;
   transmitting, by the processor, the first Bluetooth low energy advertising packet as a first virtual Bluetooth low energy peripheral device via a Bluetooth low energy radio set of a Bluetooth low energy peripheral device; and
   transmitting, by the processor, the second Bluetooth low energy advertising packet as a second virtual Bluetooth low energy peripheral device via the Bluetooth low energy radio set of the Bluetooth low energy peripheral device;
   wherein the first Bluetooth low energy advertising packet and the second Bluetooth low energy advertising packet are configured to be correlated to the Bluetooth low energy radio set as a common hardware device to define an aggregated payload including content from the first Bluetooth low energy advertising packet and content from the second Bluetooth low energy advertising packet.

2. The computer-implemented method of claim 1, wherein the first device attribute includes a first universal unique identifier, and the second device attribute includes a second universal unique identifier.

3. The computer-implemented method of claim 1, wherein the first device attribute includes a first MAC address, and the second device attribute includes a second MAC address.

4. The computer-implemented method of claim 1, wherein the first device attribute includes a first Bluetooth low energy peripheral profile, and the second device attribute includes a second Bluetooth low energy peripheral profile.

5. The computer-implemented method of claim 1, wherein
   transmitting the first Bluetooth low energy advertising packet includes transmitting the first Bluetooth low energy advertising packet at a first time interval; and
   transmitting the second Bluetooth low energy advertising packet includes transmitting the second Bluetooth low energy advertising packet at a second time interval.

6. The computer-implemented method of claim 1, wherein transmitting the first Bluetooth low energy advertising packet and transmitting the second Bluetooth low energy advertising packet includes time-wise multiplexing the first Bluetooth low energy advertising packet and the second Bluetooth low energy advertising packet.

7. A computer-program product comprising a non-transitory computer readable medium having a plurality of instructions stored thereon, which, when executed by a processor, cause the processor to perform operations comprising:
   defining a first Bluetooth low energy advertising packet having a first device attribute;
   defining a second Bluetooth low energy advertising packet having a second device attribute;
   transmitting the first Bluetooth low energy advertising packet as a first virtual Bluetooth low energy peripheral device via a Bluetooth low energy radio set of a Bluetooth low energy peripheral device; and
   transmitting the second Bluetooth low energy advertising packet as a second virtual Bluetooth low energy peripheral device via the Bluetooth low energy radio set of the Bluetooth low energy peripheral device;
   wherein the first Bluetooth low energy advertising packet and the second Bluetooth low energy advertising packet are configured to be correlated to the Bluetooth low energy radio set as a common hardware device to define an aggregated payload including content from the first Bluetooth low energy advertising packet and content from the second Bluetooth low energy advertising packet.

8. The computer program product of claim 7, wherein the first device attribute includes a first universal unique identifier, and the second device attribute includes a second universal unique identifier.

9. The computer-program product of claim 7, wherein the first device attribute includes a first MAC address, and the second device attribute includes a second MAC address.

10. The computer program product of claim 7, wherein the first device attribute includes a first Bluetooth low energy peripheral profile, and the second device attribute includes a second Bluetooth low energy peripheral profile.

11. The computer-program product of claim 7, wherein
    transmitting the first Bluetooth low energy advertising packet includes transmitting the first Bluetooth low energy advertising packet at a first time interval; and
    transmitting the second Bluetooth low energy advertising packet includes transmitting the second Bluetooth low energy advertising packet at a second time interval.

12. The computer program product of claim 7, wherein transmitting the first Bluetooth low energy advertising packet and transmitting the second Bluetooth low energy advertising packet includes time-wise multiplexing the first Bluetooth low energy advertising packet and the second Bluetooth low energy packet.

13. A computing system comprising:
    a processor device coupled with a memory device, the processor device configured for:
       defining a first Bluetooth low energy advertising packet having a first device attribute; and
       defining a second Bluetooth low energy advertising packet having a second device attribute; and
    a Bluetooth low energy radio set configured for:
       transmitting the first Bluetooth low energy advertising packet as a first virtual Bluetooth low energy peripheral device of a Bluetooth low energy peripheral device; and
       transmitting the second Bluetooth low energy advertising packet as a second virtual Bluetooth low energy peripheral device via the Bluetooth low energy radio set of the Bluetooth low energy peripheral device;
       wherein the first Bluetooth low energy advertising packet and the second Bluetooth low energy advertising packet are configured to be correlated to the Bluetooth low energy radio set as a common hardware device to define an aggregated payload including content from the first Bluetooth low energy advertising packet and content from the second Bluetooth low energy advertising packet.

14. The computing system of claim 13, wherein the first device attribute includes a first universal unique identifier, and the second device attribute includes a second universal unique identifier.

15. The computing system of claim 13, wherein the first device attribute includes a first MAC address, and the second device attribute includes a second MAC address.

16. The computing system of claim 13, wherein the first device attribute includes a first Bluetooth low energy peripheral profile, and the second device attribute includes a second Bluetooth low energy peripheral profile.

17. The computing system of claim 13, wherein
transmitting the first Bluetooth low energy advertising packet includes transmitting the first Bluetooth low energy advertising packet at a first time interval; and
transmitting the second Bluetooth low energy advertising packet includes transmitting the second Bluetooth low energy advertising packet at a second time interval.

18. The computing system of claim 13, wherein transmitting the first Bluetooth low energy advertising packet and transmitting the second Bluetooth low energy advertising packet includes time-wise multiplexing the first Bluetooth low energy advertising packet and the second Bluetooth low energy advertising packet.

* * * * *